(12) United States Patent
Muchherla et al.

(10) Patent No.: US 11,922,029 B2
(45) Date of Patent: Mar. 5, 2024

(54) MODIFIED READ COUNTER INCREMENTING SCHEME IN A MEMORY SUB-SYSTEM

(71) Applicant: MICRON TECHNOLOGY, INC., Boise, ID (US)

(72) Inventors: Kishore Kumar Muchherla, Fremont, CA (US); Jonathan S. Parry, Boise, ID (US); Nicola Ciocchini, Boise, ID (US); Animesh Roy Chowdhury, Boise, ID (US); Akira Goda, Tokyo (JP); Jung Sheng Hoei, Newark, CA (US); Niccolo' Righetti, Boise, ID (US); Ugo Russo, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 51 days.

(21) Appl. No.: 17/863,000

(22) Filed: Jul. 12, 2022

(65) Prior Publication Data

US 2023/0393756 A1 Dec. 7, 2023

Related U.S. Application Data

(60) Provisional application No. 63/348,399, filed on Jun. 2, 2022.

(51) Int. Cl.
*G06F 3/06* (2006.01)

(52) U.S. Cl.
CPC .......... *G06F 3/0619* (2013.01); *G06F 3/0653* (2013.01); *G06F 3/0679* (2013.01)

(58) Field of Classification Search
CPC ..... G06F 3/0619; G06F 3/0653; G06F 3/0679
USPC .......................................................... 711/154
See application file for complete search history.

(56) References Cited

U.S. PATENT DOCUMENTS

| 9,240,245 B1* | 1/2016 | Bellorado | G11C 16/3422 |
|---|---|---|---|
| 2020/0097211 A1* | 3/2020 | Alsasua | G06F 3/0659 |
| 2021/0034274 A1* | 2/2021 | Muchherla | G11C 16/3431 |
| 2021/0035649 A1* | 2/2021 | Muchherla | G06F 3/0619 |
| 2023/0039624 A1* | 2/2023 | Sharifi Tehrani | G11C 16/3495 |
| 2023/0040070 A1* | 2/2023 | Singh | G06F 11/079 |
| 2023/0063498 A1* | 3/2023 | Xie | G06F 3/0679 |
| 2023/0195361 A1* | 6/2023 | Zeng | G06F 3/0679 |
| | | | 711/154 |

* cited by examiner

*Primary Examiner* — Than Nguyen
(74) *Attorney, Agent, or Firm* — Lowenstein Sandler LLP

(57) ABSTRACT

A system includes a memory device including multiple memory cells and a processing device operatively coupled to the memory device. The processing device is to receive a first read command at a first time. The first read command is with respect to a set of memory cells of the memory device. The processing device is further to receive a second read command at a second time. The second read command is with respect to the set of memory cells of the memory device. The processing device is further to increment a read counter for the memory device by a value reflecting a difference between the first time and the second time. The processing device is further to determine that a value of the read counter satisfies a threshold criterion. The processing device is further to perform a data integrity scan with respect to the set of memory cells.

20 Claims, 8 Drawing Sheets

US 11,922,029 B2

MODIFIED READ COUNTER INCREMENTING SCHEME IN A MEMORY SUB-SYSTEM

RELATED APPLICATIONS

This application claims the benefit of U.S. Provisional Patent Application No. 63/348,399 filed Jun. 2, 2022, the entire contents of which are incorporated by reference herein.

TECHNICAL FIELD

Embodiments of the disclosure relate generally to memory sub-systems, and more specifically, relate to read counter incrementing for a memory device.

BACKGROUND

A memory sub-system can be a storage system, a memory module, or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
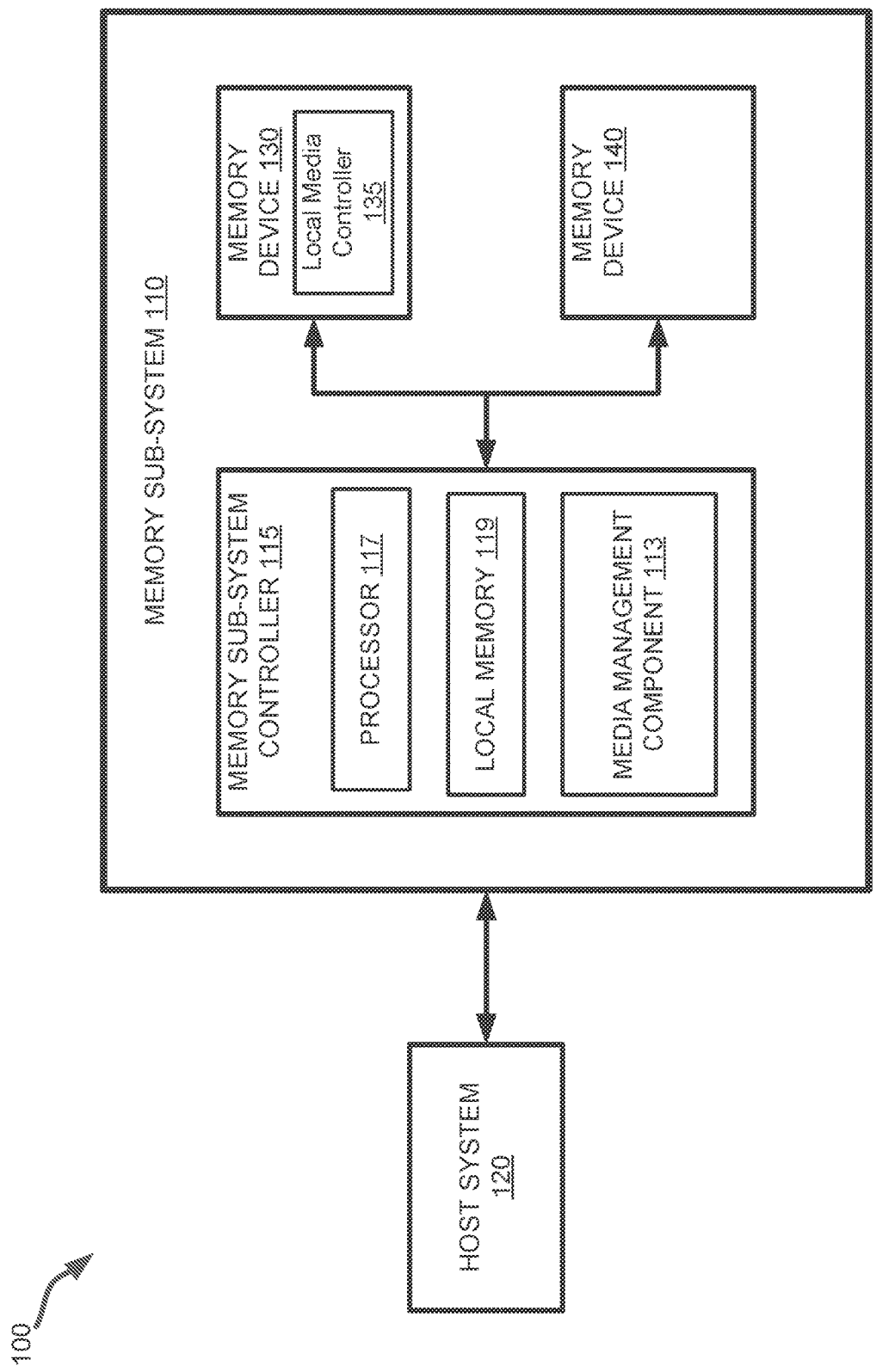
FIG. 1A illustrates an example computing environment that includes a memory sub-system in accordance with some embodiments of the present disclosure.

Aspects of the present disclosure are directed to a read counter incrementing scheme in a memory sub-system. A memory sub-system can be a storage device, a memory module, or a hybrid of a storage device and memory module. Examples of storage devices and memory modules are described below in conjunction with FIG. 1A. In general, a host system can utilize a memory sub-system that includes one or more memory components. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

When data is written to a memory cell of the memory component for storage, the memory cell can deteriorate. Accordingly, each memory cell of the memory component can handle a finite number of write operations performed before the memory cell is no longer able to reliably store data. Data stored at the memory cells of the memory component can be read from the memory component and transmitted to a host system. When data is read from a memory cell of the memory component, nearby or adjacent memory cells can experience what is known as read disturb. Read disturb is the result of continually reading from one memory cell without intervening erase operations, causing other nearby memory cells to change over time (e.g., become programmed). If too many read operations are performed on a memory cell, data stored at adjacent memory cells of the memory component can become corrupted or incorrectly stored at the memory cell. This can result in a higher error rate of the data stored at the memory cell. This can increase the use of an error detection and correction operation (e.g., an error control operation) for subsequent operations (e.g., read and/or write) performed on the memory cell. The increased use of the error control operation can result in a reduction of the performance of a conventional memory sub-system. In addition, as the error rate for a memory cell or block continues to increase, it may even surpass the error correction capabilities of the memory sub-system, leading to an irreparable loss of the data. Furthermore, as more resources of the memory sub-system are used to perform the error control operation, fewer resources are available to perform other read operations or write operations.

The error rate associated with data stored at the block can increase due to read disturb. Therefore, upon a threshold number of read operations being performed on the block, the memory sub-system can perform a data integrity check (e.g., a read disturb scan, also referred to herein as a "scan") to verify that the data stored at the block does not include any errors. During the data integrity check, one or more reliability statistics are determined for data stored at the block. One example of a reliability statistic is raw bit error rate (RBER). The RBER corresponds to a number of bit errors per unit of time that the data stored at the block experiences.

If the reliability statistic for a block exceeds a threshold value indicating a high error rate associated with data stored at the block due to read disturb, then the data stored at the block can be relocated to a new block of the memory sub-system. Relocating the data stored at old the block to the new block can include writing the data to the new block to refresh the data stored by the memory sub-system. This can be done to negate the effects of read disturb associated with the data and to erase the data at the old block. However, as previously discussed, read disturb can affect memory cells that are adjacent to the memory cell that a read operation is performed on. Therefore, read disturb can induce a non-uniform stress on memory cells of the block if particular memory cells are read from more frequently. For example, memory cells of a block that are adjacent to a memory cell that is frequently read from can have a high error rate, while memory cells that are not adjacent to the memory cell can have a lower error rate due to a reduced impact by read disturb on these memory cells.

Depending on the data access activity of the host system for a particular memory sub-system, the effects of read disturb can be either focused on one or more particular memory pages in a block or distributed more evenly across all the memory pages of the block. If read stress is focused on a single memory page, for example, the block can be considered to be experiencing single wordline (SWL) read disturb. Single wordline read disturb can occur in situations where a certain piece of data stored in the memory sub-system is read significantly more often than the rest of the data in the same block. If the read stress is uniformly distributed across multiple memory pages, however, the block can be considered to be experiencing uniform read disturb. Uniform read disturb can occur in situations where each piece of data in a block is read with approximately the same frequency.

Additionally, read disturb can linger on a block after the read command is completed. This is due to latent read disturb. Latent read disturb is caused by a lingering voltage on a memory cell left after a read operation. A component of latent read disturb on a block can decrease over time. The lingering voltage can decrease over time, but may cause read disturb stress until the voltage dissipates. If read commands are issued in quick succession, for example, the latent read disturb stress component is reduced, thus only a small amount of latent read disturb accumulates. If read commands are issued with delay in between a first read command and a second read command, the latent read disturb stress component per read is increased, thus a comparatively larger amount of latent read disturb accumulates. Less read disturb stress may be experienced by memory cells of the block when a delay between read commands is small.

A memory sub-system can perform a data integrity check at the block level using a scan operation (e.g., a data integrity scan). Since scan operations are performed at the block level, the memory sub-system monitors the number of read operations performed on a particular block and performs a scan operation when the read count (i.e., the number of read operations) meets or exceeds a certain read threshold. Depending on the implementation, the memory sub-system can maintain a read counter or multiple read counters that track the number of read operations performed on the block. The controller generally cannot distinguish between single wordline read disturb stress and uniform read disturb stress, or between active read disturb stress and latent read disturb stress, so it utilizes a conservative read threshold set based on single wordline read disturb stress. When memory cells coupled to one wordline in a physical block experience single wordline read disturb stress, the read count to trigger the scan can be significantly lower than the read count of another wordline that only experiences uniform read disturb stress. Similarly, when substantially all memory cells of a physical block experience latent read disturb stress, the read count to trigger the scan can be significantly lower than another block that experiences only active read disturb stress. If both wordlines are part of the same physical block and the memory sub-system maintains a common read counter for the physical block, the threshold number of read operations will be met significantly faster than the actual number of reads seen by any of the individual wordlines in the physical block. Thus, although it may be appropriate to scan memory cells coupled to that one wordline, such a scan operation may not be necessary for the remainder of the physical block. Performing unnecessary scan operations in this manner can result in the performance of excessive memory management operations by the memory sub-system. This can result in a decrease of performance of the memory sub-system, as well as an increase in the power consumption of the memory sub-system. System bandwidth and other resources can also be tied up for extended periods of time, preventing the use of those resources for other functionality.

Aspects of the present disclosure address the above and other deficiencies by using a modified read counter incrementing scheme for triggering data integrity scans in a memory sub-system. The memory sub-system can utilize a first-in-first-out (FIFO) read command matrix to track sequential read commands directed to the same set of memory cells (e.g., to the same block, sub-block, or page of a memory device). Each entry of the matrix can store block addresses and/or wordline addresses corresponding to each read command and a timestamp corresponding to when the read command was received. The read command matrix may have a finite capacity, so data corresponding to an least recent read command may be deleted from the matrix before data corresponding to a new read command is stored in the matrix. As data corresponding to the least recent read command is deleted, the memory sub-system controller may search the matrix to find a read command with respect to the same block and/or wordline address as the read command that is being deleted. The controller may then determine the time difference between the timestamps of the two read commands and compute the read count scaling factor that is based on the time difference. The controller may then increment the read counter by a scaled amount based on the scaling factor. The scaling factor may be determined using a look-up table that associates time differences with a scaling factor value. Incrementing the read counter by the scaled amount may result in a lower (and more accurate) estimate of latent read disturb stress present when read commands are issued in quick succession, which, in turn, results in the reduced frequency of data integrity scans, thereby increasing performance, decreasing power consumption and freeing system resources for other functionality.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, PE cycle counting (e.g., counting PE cycles of memory devices 130, etc.), and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations (e.g., programming operations, two-pass programming operations, etc.) on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 may include a media management component 113 that can be used to increment a read counter corresponding to one of memory devices 130 and/or 140. The read counter may pertain to a specific memory block of one of the memory devices 130 or 140. In some embodiments, each block of memory devices 130 and 140 has a corresponding read counter. The read counter can be used to track a number of read operations performed on the block. Media management component 113 may be responsible for incrementing the read counter and/or multiple read counters, each read counter pertaining to a physical block of memory devices 130 or 140. When a value of the read counter reaches a threshold value, a data integrity scan (e.g., also referred to herein as "a read disturb scan") may be triggered to determine an error rate for a number of memory cells of the physical block. The data integrity scan may include reading data stored at a block of memory cells and relocating the data to another block of memory cells if the error rate is too high. In some embodiments, the data integrity scan is to determine data errors in memory cells. In many embodiments, the data errors may be the result of read disturb stress. In some embodiments, the read counter(s) are maintained in local memory 119.

In some embodiments, the media management component 113 increments a read counter based on a scaling factor. The media management component 113 may increment the read counter by a weighted read count value. The scaling factor may be determined by the media management component 113. The media management component 113 may determine time durations between successive read operations performed on a specific memory block or wordline. In some embodiments, the media management component 113 may log read commands (e.g., one or more characteristics of the read commands) in a FIFO matrix (e.g., read command matrix 300 of FIG. 3, discussed below) as the read commands are received. The media management component 113 may log information pertaining to a received read command in a new entry of the FIFO matrix. Information pertaining to the received read command may include a physical block address specified by the read command (e.g., a block address of the memory cells the read command instructs processing logic to read), a wordline address specified by the read command (e.g., a wordline address of the memory cells the read command instructs processing logic to read), and/or a timestamp corresponding to when the read command was received. Because the FIFO matrix may have a finite capacity, the media management component 113 may further delete the least recent entry from the FIFO matrix when a new read command is received. In some embodiments, the FIFO matrix is maintained in local memory 119.

In some embodiments, before the media management component 113 deletes the least recent entry from the FIFO matrix, the media management component 113 searches the FIFO matrix for another read command specifying the same block address as the least recent read command. The media management component 113 may search for the next entry in the FIFO matrix specifying a block address and/or a wordline address that matches the block address and/or wordline address specified by the least recent entry. Upon finding an entry in the FIFO matrix reflecting a matching address, the media management component 113 may compute the difference between the timestamps of the two entries. The time difference may reflect a duration between when the least recent read command was received and when the next read command with respect to the same address (e.g., block address, wordline address) was received. Media management component 113 may determine a scaling factor based on the time difference. A short duration between read commands to the same memory address may cause less read disturb (e.g., latent read disturb) than a comparatively longer duration between read commands to the same memory address. Thus, data integrity scans can be performed less often when read commands are issued to the same memory address (e.g., block address, wordline address) in rapid succession. The scaling factor may be a weighted read counter increment value. The read counter may determine the scaling factor from a look-up table (e.g., stored in local memory 119, look-up table 400 of FIG. 4, discussed below) that correlates time difference values with scaling factor values. After determining the scaling factor, the media management component 113 may increment a read counter corresponding to the block. The media management component 113 may increment the read counter less than a full value, thus accounting for lessened read disturb (e.g., latent read disturb) present according to the duration between successive read operations to the same physical address (e.g., block address). A data integrity scan may be triggered (e.g., by media management component 113) when the read counter reaches a threshold value. The threshold value may be a predetermined value of read operations performed on the block. Further details with regards to the media management component 113 are described below.

Figure 1B:
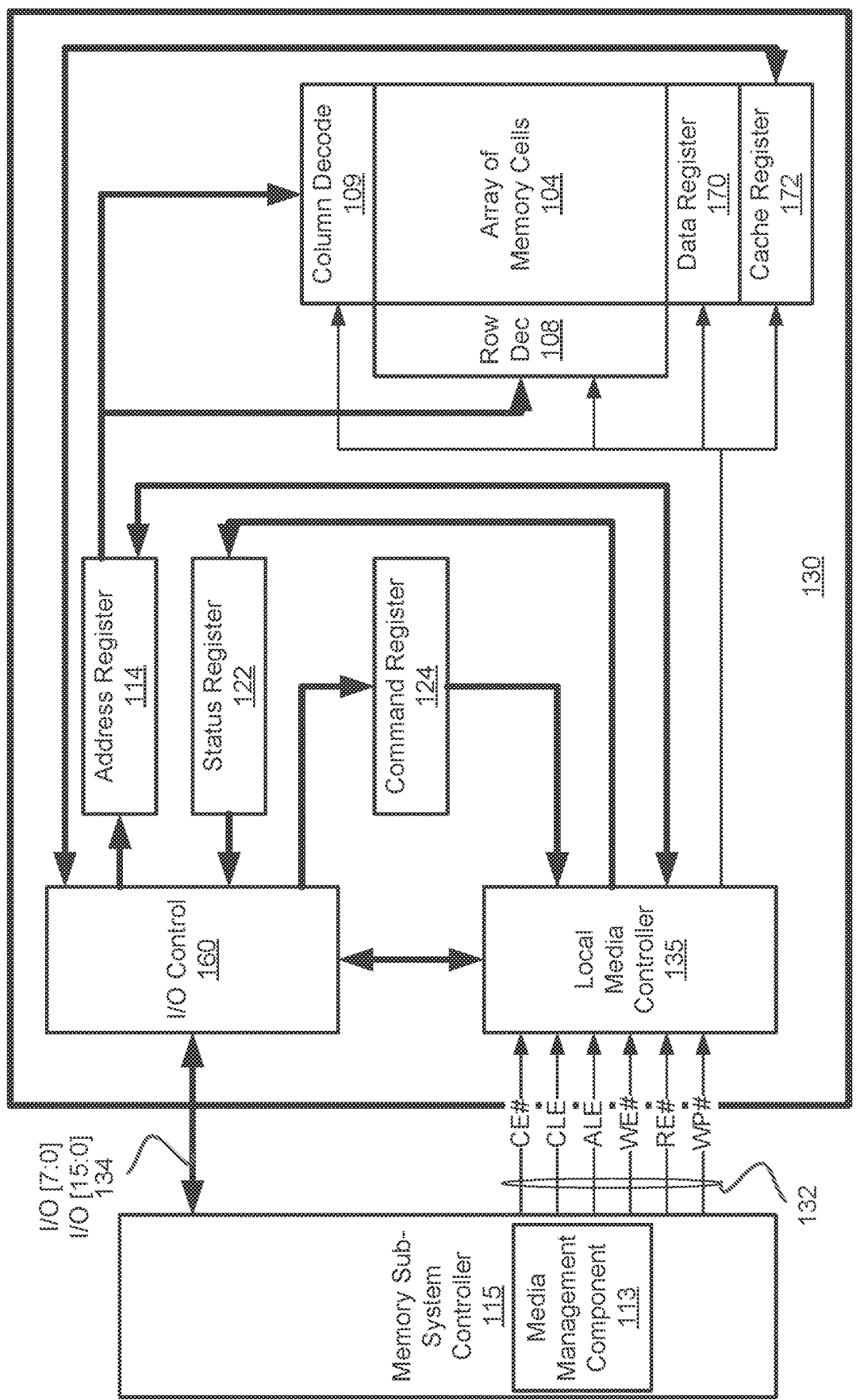
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device. In one embodiment, memory sub-system controller 115 includes media management component 113 configured to perform the read counter incrementing operations described herein including incrementing a read counter based on a scaling factor determined by the media management component 113.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands may be received over input/output (I/O) pins [7:0] of I/O bus 134 at I/O control circuitry 160 and may then be written into command register 124. The addresses may be received over input/output (I/O) pins [7:0] of I/O bus 134 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
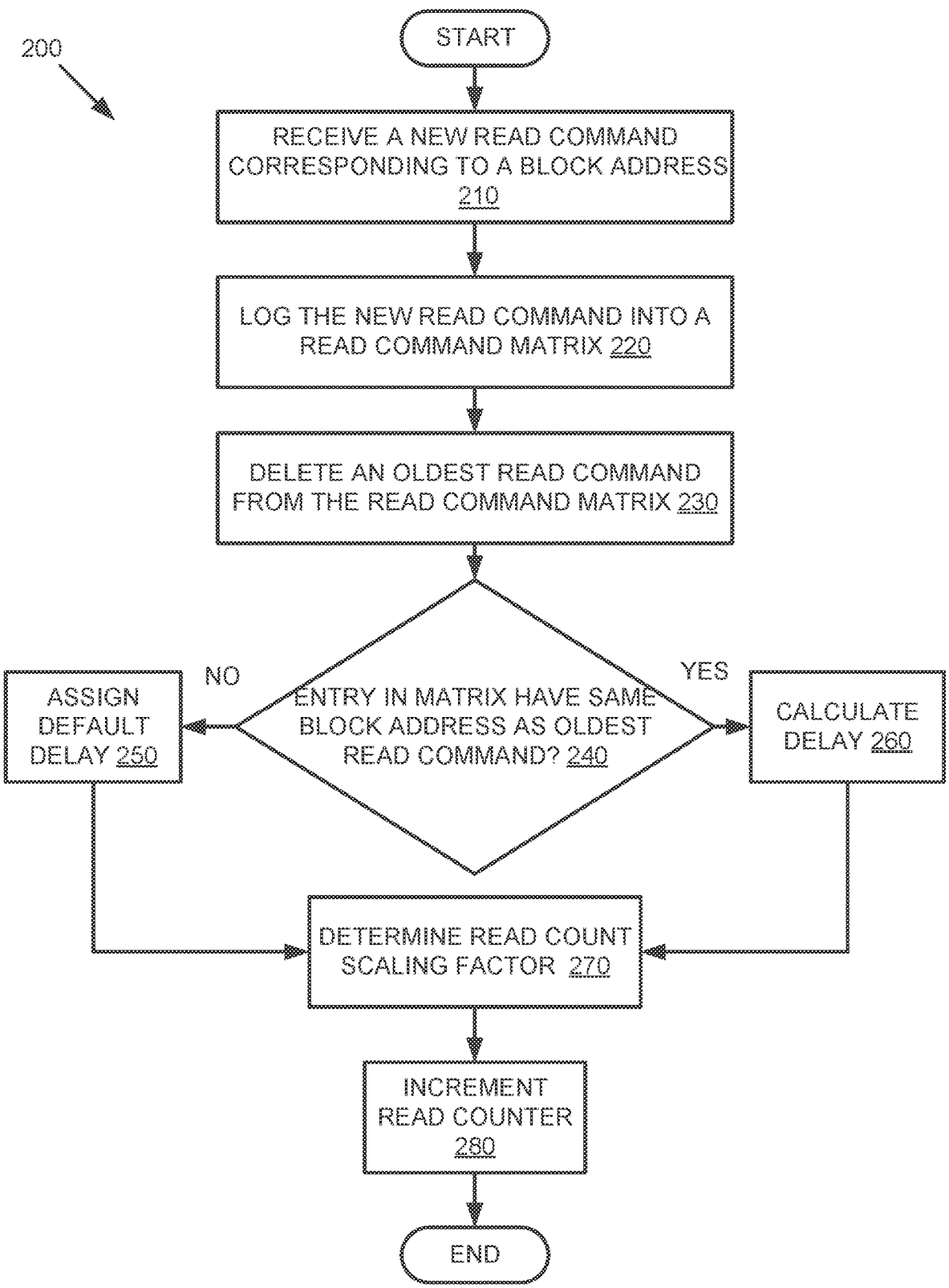
FIG. 2 is a flow diagram of an example method of incrementing a read counter for a memory device using a first-in-first-out matrix in accordance with some embodiments of the present disclosure.
Figure 3:
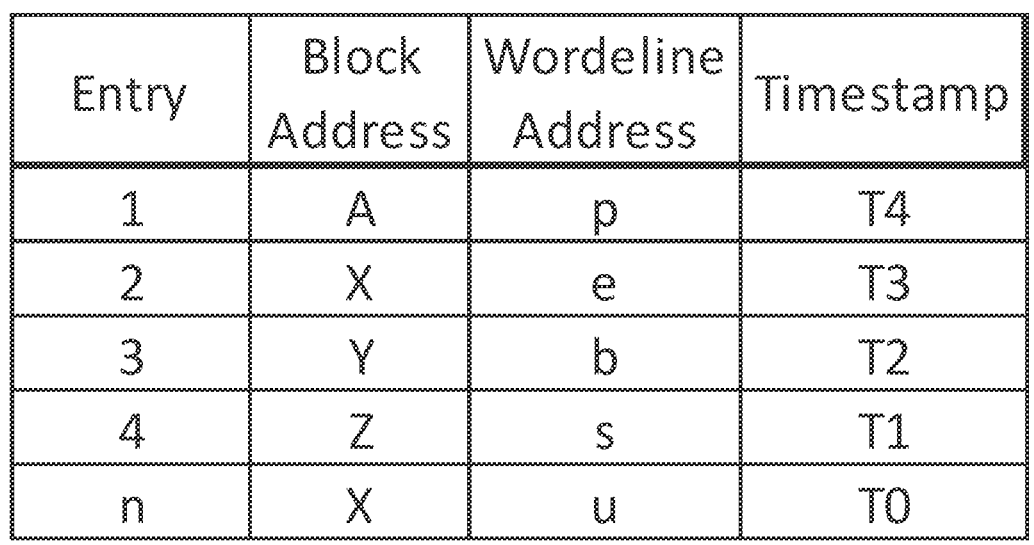
FIG. 3 is an example read command matrix for an example method of incrementing a read counter for a memory device in accordance with some embodiments of the present disclosure.
Figure 4:
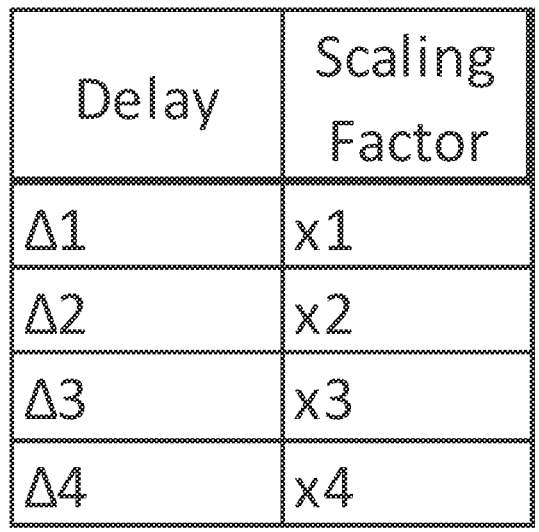
FIG. 4 is an example look-up table for an example method of incrementing a read counter for a memory device in accordance with some embodiments of the present disclosure.

FIG. 2 is a flow diagram of an example method 200 of incrementing a read counter for a memory device using a FIFO matrix in accordance with some embodiments of the present disclosure. FIG. 3 is an example read command matrix 300 for an example method 200 of incrementing a read counter for a memory device in accordance with some embodiments of the present disclosure. FIG. 4 is an example look-up table 400 for an example method 200 of incrementing a read counter for a memory device in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the media management component 113 of FIGS. 1A-1B. In some embodiments, the method 200 is performed by the host system 120 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, processing logic receives a new read command. The new read command may correspond to a set of memory cells located at a physical block address. In some embodiments, the new read command specifies the physical block address at which the set of memory cells are located. In many embodiments, the read counter pertaining to the block at the physical block address is not incremented when the read command is received. The read counter may be incremented at a later operation (e.g., operation 280) described below.

At operation 220, processing logic logs the new read command into a read command matrix. The processing logic may create a new entry pertaining to the new read command in the read command matrix. The read command matrix may be a FIFO matrix (e.g., read command matrix 300 of FIG. 3), as described herein. In some embodiments, the read command matrix tracks read commands received over a period of time. The processing logic may log one or more characteristics of the read command into the FIFO matrix. The characteristics may include a timestamp of the read command and/or a physical address specified by the read command. For example, referring to read command matrix 300 of FIG. 3, for a new read command, processing logic creates entry "1" in the matrix. Processing logic may enter the block address "A" specified by the new read command and/or a timestamp "T4" corresponding to when the new read command was received. The read command matrix may be to track a series of read commands received.

At operation 230, because the read command matrix (e.g., matrix 300 of FIG. 3) may have finite capacity, processing logic deletes the least recent entry from the read command matrix corresponding to the least recent read command. For example, referring again to FIG. 3, the least recent entry may be labeled "n." The least recent entry may reflect a block address specified by the least recent read command and/or a timestamp corresponding to when the least recent read command was received. For example, entry n of matrix 300 may reflect a read operation with respect to the physical address X (e.g., physical block X). In some embodiments, before deleting the least recent entry, the processing logic searches the read command matrix to find an entry reflecting an address matching the address reflected by the least recent entry (e.g., the entry about to be deleted).

At operation 240, processing logic determines whether another entry in the read command matrix reflects a block address matching the block address corresponding to the least recent read command. The processing logic may determine whether a subsequent read command was received with respect to the same block address as the least recent read command. The processing logic may search the read command matrix for an entry reflecting the same address (e.g., physical address) as the least recent read command. The processing logic may determine, by searching the read command matrix, if the same block address reflected in the least recent entry experienced a subsequent read operation. The processing logic can determine this by searching the read command matrix for another entry reflecting the same block address. If such an entry is found, processing logic proceeds to operation 260. If no such entry is found, processing logic proceeds to operation 250. If multiple such entries are found, processing logic may proceed to operation 260. For example, the processing logic may search matrix 300 for an entry reflecting the same block address reflected in entry n. Entry n may reflect block address X, so processing logic may search matrix 300 for another entry also reflecting block address X. Processing logic may find entry 2 of matrix 300, which also reflects block address X.

In some embodiments, processing logic assumes—without searching the read command matrix—that a later read command was issued subsequent to the least recent read command. The processing logic may assume that the later read command was issued at an assumed time after the least recent read command was received. By making this assumption, processing logic may not rely on entering block addresses of read commands into the read command matrix. Instead, processing logic may use a predetermined value to associate the least recent read command with another hypothetical read command.

At operation 260, processing logic calculates the delay between the time the least recent read command was received and the time the next read command reflecting the same address was received. The delay may reflect the amount of latent read disturb stress experienced by memory cells of the block. The processing logic may calculate the delay based on the timestamps corresponding to the two entries stored in the read command matrix. Continuing the example above, the timestamp of entry n of matrix 300 may indicate that the corresponding read command was received at time T0. The timestamp of entry 2 of matrix 300 (e.g., an entry reflecting the same block address X as entry n) may indicate that the corresponding read command was received at time T3. The processing logic may determine a time difference (e.g., duration) between time T3 and time T0. In some embodiments, the processing logic calculates the delay responsive to determining that the two read commands were with respect to a matching block address (e.g., to the same block address X). In instances where multiple read commands were issued to the same address, the processing logic may determine the average delay between the read commands.

In some embodiments, at operation 260, processing logic determines an average delay of the read command entries stored in the read command matrix. For example, processing logic can determine a number of entries in the read command matrix and a total time difference between the timestamp of the least recent entry and the newest entry to determine an average delay. Referring to FIG. 3, for example, processing logic can determine that matrix 300 includes n entries and that a total time difference is T4-T0. Processing logic can determine an average delay for matrix 300 by dividing the total time difference (T4−T0) by n.

At operation 250, because no entry in the read command matrix was found reflecting an address matching the address corresponding to the least recent read command, processing logic assigns a default delay. The default delay may be a predetermined delay value that reflects a worst-case delay (e.g., a delay duration that causes a maximum amount of latent read disturb stress). Alternatively, the default delay may reflect an average read delay (e.g., an average time duration between read operations directed to the same physical address) calculated by the processing logic based on historical delays already calculated by processing logic.

At operation 270, processing logic determines a read count scaling factor. The scaling factor is a factor by which a read counter will be incremented (e.g., at operation 280 below) in order to accurately reflect an amount of stress caused by read operations on memory cells. The processing logic may determine the scaling factor based on values stored in a look-up table (e.g., look-up table 400 of FIG. 4) accessible to the processing logic. The look-up table may contain values that map discrete delay values with discrete scaling factor values. For example, referring to FIG. 4, look-up table 400 may include a column of delay values and a column of scaling factor values. A delay value Δ1 may correlate to a scaling factor of x1. In another example, a delay value corresponding to Δ3 may correlate to a scaling factor of x3.

At operation 280, processing logic increments the read counter associated with the physical address of a block of a memory device. The read counter may be incremented based on the scaling factor determined at operation 270 above. Incrementing the read counter based on the scaling factor may account for the presence or lack of latent read disturb that occurs subsequent to a read operation. For example, incrementing the read counter based on the scaling factor may slow the accumulation of the read counter. This may be appropriate when there is less latent read disturb, such as when read operations are performed to the same physical address in quick succession. In another example, incrementing the read counter based on the scaling factor may accelerate the accumulation of the read counter. This may be appropriate when there is more latent read disturb, or when there is row-hammer read disturb, such as when read operations are performed to the same physical address with delay between the read operations. The read counter may reach a predetermined value to trigger a data integrity scan at a time corresponding to the amount of read disturb and/or latent read disturb experienced by the memory cells.

Figure 5:
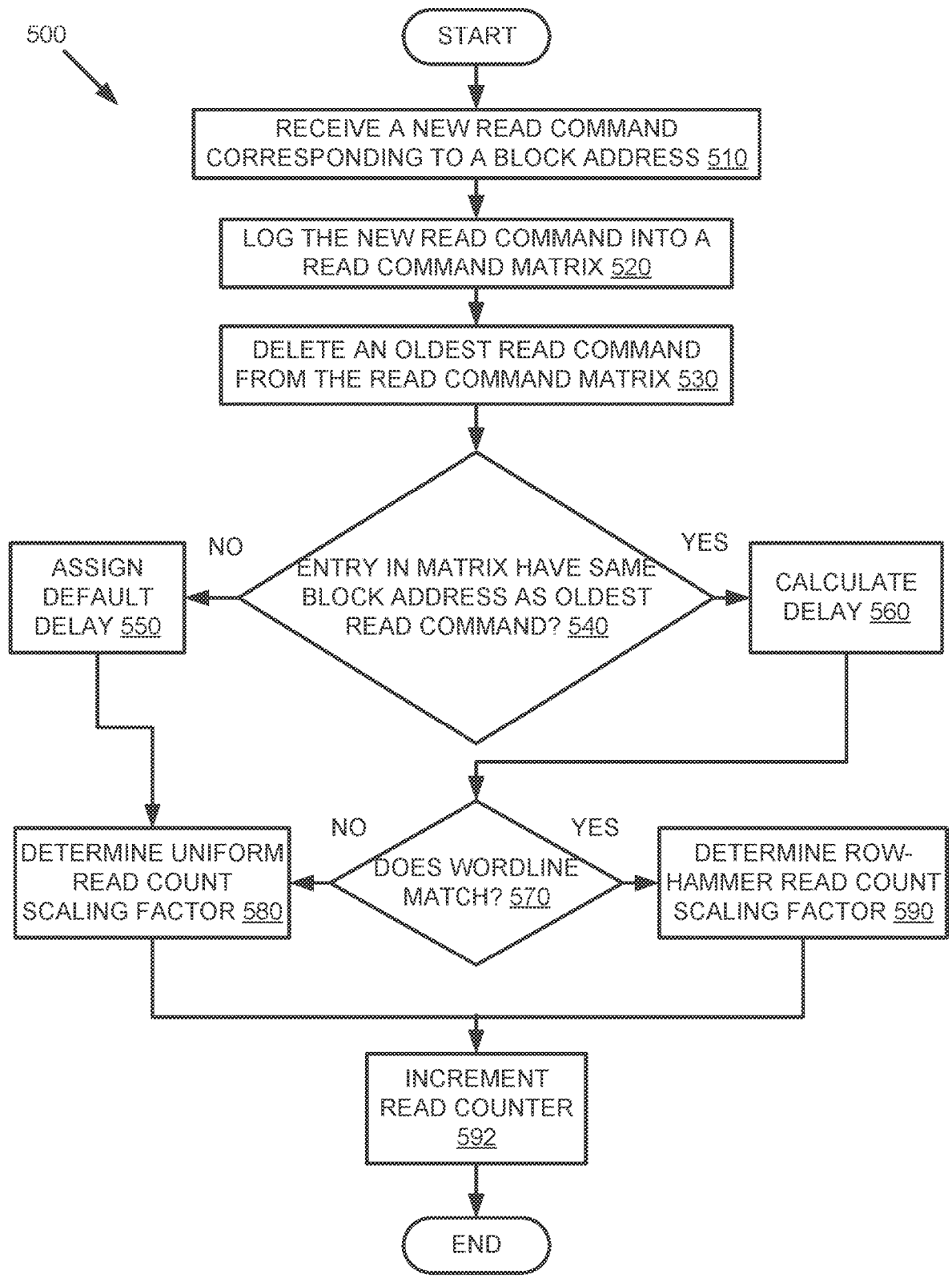
FIG. 5 is a flow diagram of an example method of incrementing a read counter for a memory device using a first-in-first-out matrix in accordance with some embodiments of the present disclosure.

FIG. 5 is a flow diagram of an example method 500 of incrementing a read counter for a memory device using a first-in-first-out matrix in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the media management component 113 of FIGS. 1A-1B. In some embodiments, the method 200 is performed by the host system 120 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, processing logic receives a new read command. The new read command may correspond to a set of memory cells located at a physical block address and/or a physical wordline address. In some embodiments, the new read command specifies the physical block address and/or the physical wordline address.

At operation 520, processing logic logs the new read command into a read command matrix (e.g., matrix 300 of FIG. 3). The processing logic may program a characteristic of the read command into the read command matrix. The characteristic may be one or more of a timestamp of the read command, or a physical address specified by the read command. For example, referring to FIG. 3, processing logic may enter a block address A specified by the read command and/or a wordline address p specified by the read command into entry 1 of matrix 300. Processing logic may additionally enter a timestamp of the read command into entry 1 corresponding to when the read command was received at time T4.

At operation 530, because the read command matrix may have finite capacity (e.g., as described herein), processing logic deletes an entry from the read command matrix corresponding to the least recent (e.g., oldest) read command (e.g., the oldest entry, entry n of matrix 300). The least recent entry may reflect a block address and/or a wordline address specified by the least recent read command and/or a timestamp corresponding to when the least recent read command was received. For example, entry n of matrix 300 may reflect block address X and/or wordline address u. Additionally, entry n may indicate that the corresponding read command was received at time T0.

At operation 540, processing logic determines whether an entry in the read command matrix reflects a block address matching the block address corresponding to the least recent read command. The processing logic may search the read command matrix for an entry corresponding to a read command received subsequent to the least recent read command directed to the same address (e.g., physical address) as the least recent read command. If such an entry is found, processing logic proceeds to operation 560. If no such entry is found, processing logic proceeds to operation 550. If multiple such entries are found, processing logic may proceed to operation 560. For example, the processing logic may search matrix 300 for an entry reflecting the same block address reflected in entry n. Entry n may reflect block address X, so processing logic may search matrix 300 for another entry also reflecting block address X. Processing logic may find entry 2 of matrix 300, which also reflects block address X.

At operation 560, processing logic calculates a delay between the time the least recent read command was received and the time the next read command specifying the same address was received. The processing logic may calculate the delay based on the timestamps corresponding to the two entries stored in the read command matrix. For example, referring to FIG. 3, processing logic may determine a time difference (e.g., duration) between time T3 and time T0. In some embodiments, the processing logic calculates the delay responsive to the two read commands specifying matching block addresses (e.g., entry n and entry 2 of matrix 300 both reflect a block address X).

At operation 550, because no entry in the read command matrix was found reflecting an address matching the address specified by the least recent read command, processing logic assigns a default delay. The default delay may be a predetermined delay value that reflects a worst-case delay (e.g., a delay that contributes to a maximum amount of latent read disturb stress). Alternatively, the default delay may reflect an average delay calculated by the processing logic based on historical delays already calculated by processing logic.

At operation 570, processing logic determines whether the physical wordline address specified by the least recent read command matches the physical wordline address reflected in the entry found in the read command matrix in operation 540. If the physical wordline addresses match, the memory cells coupled to the wordline may have suffered a row-hammer stress from repeated read operations. This row-hammer stress may cause significant read disturb and/or significant latent read disturb significantly greater than uniform read disturb. If the physical wordline addresses do not match, the memory cells may suffer from a uniform read stress. In such case, it can be assumed that all memory cells of the memory block corresponding to the read commands suffer from a uniform read disturb stress and/or a uniform latent read disturb stress. For example, referring to FIG. 3, because entry n and entry 2 of matrix 300 reflect the same block address X, processing logic may determine whether the wordline address reflected by entry n is the same wordline address reflected by entry 2. Entry n may reflect wordline address u while entry 2 may reflect wordline address e, which do not match. Because the wordline addresses do not match, processing logic may determine that the block corresponding to block address X has experienced a uniform read disturb stress, meaning all the memory cells of the block have experienced a substantially similar amount of read disturb stress. However, if the wordline addresses do match (e.g., not illustrated), processing logic may determine that the wordline corresponding to the wordline address has experienced a row-hammer stress, meaning the memory cells coupled to the wordline have experienced more read disturb stress than other memory cells of the block due to repeated read operations on the memory cells.

At operation 580, processing logic determines a scaling factor corresponding to a uniform read disturb stress experienced by the memory cells of the block corresponding to the matching block address of the read commands. The scaling factor may be determined based on values stored in a look-up table accessible to the processing logic. The look-up table may map delay values with scaling factor values. The values of the look-up table may reflect a row-hammer read disturb. The look-up table may be similar to look-up table 400 shown in FIG. 4 and described above.

At operation 590, processing logic determines a scaling factor corresponding to a row-hammer read disturb stress experienced by the memory cells coupled to the wordline specified by the matching wordline address of the read commands. The scaling factor may be determined based on values stored in a look-up table accessible to the processing logic. The look-up table may map delay values with scaling factor values. The values of the look-up table may reflect a row-hammer read disturb. The look-up table may be similar to look-up table 400 shown in FIG. 4 and described above. In some embodiments, a scaling factor associated with a row-hammer read disturb stress may be significantly higher than the scaling factor associated with a uniform read disturb.

At operation 592, processing logic increments the read counter associated with the physical address of a block of a memory device. The read counter may count read operations executed with respect to the block and/or the wordline (e.g., at a physical address) of the memory device. The read counter may be incremented based on the scaling factor determined at operations 580 or 590 above. For example, the read counter may be incremented by processing logic using a weighted read count value that reflects an amount of read disturb experienced by the associated memory cells (e.g., the memory cells of the block and/or wordline). Incrementing the read counter based on the scaling factor may account for the presence or lack of latent read disturb that occurs subsequent to a read operation. For example, the accumulation of the read counter may be slowed, more accurately reflecting an amount of read disturb stress experienced by the memory cells. This may be appropriate when there is less latent read disturb, such as when read operations are performed to the same physical address in quick succession. In another example, the accumulation of the read counter may be accelerated, more accurately reflecting a heightened amount of read disturb stress experience by the memory cells (e.g., as a result of row-hammer read disturb stress). This may be appropriate when there is more latent read disturb, such as when read operations are performed to the same physical address with delay between the read operations. The read counter may reach a predetermined value to trigger a data integrity scan (e.g., a read disturb scan) at a time corresponding to the amount of read disturb and/or latent read disturb experienced by the memory cells.

Figure 6:
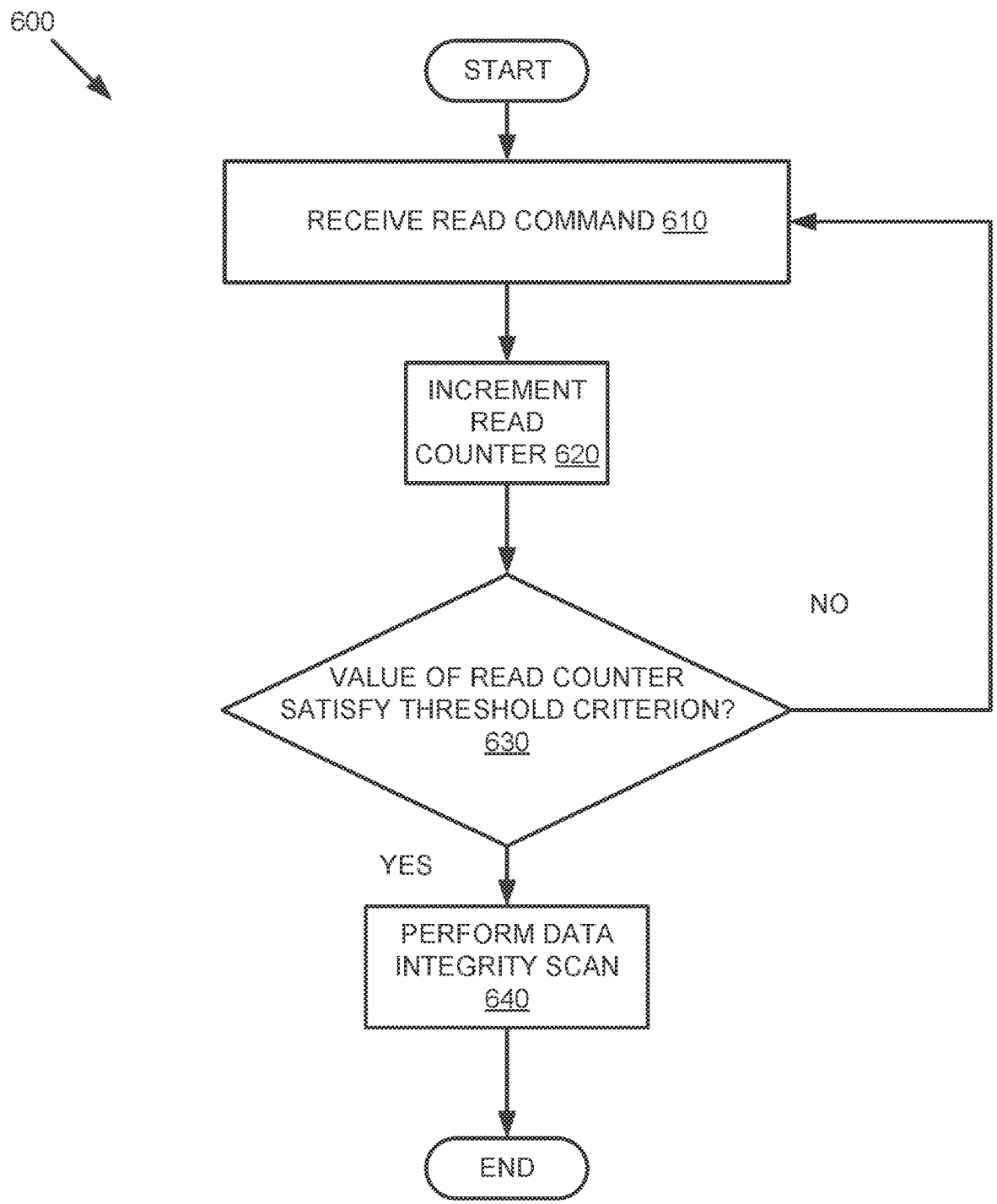
FIG. 6 is a flow diagram of an example method of performing media management operations based on a scalable memory access count in accordance with some embodiments of the present disclosure.

FIG. 6 is a flow diagram of an example method 600 of performing media management operations based on a scalable memory access count, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by media management component 113 of FIGS. 1A-1B. In some embodiments, the method 600 is performed by the host system 120 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, processing logic receives a read command. In some embodiments, through one of method 200 or method 500 described above, a read counter is incremented at operation 620. The read counter may be incremented based on a scaling factor (e.g., a weighted read count value) to account for read disturb and/or latent read disturb present in one or more memory cells of a memory device.

At operation 630, processing logic determines whether a value reflected by the read counter satisfies a threshold criterion to trigger the performance of a data integrity scan. The threshold criterion may be a predetermined threshold value. In some embodiments, the threshold value is chosen to correspond with a predetermined amount of aggregate read disturb on the memory cells. The threshold value may be a maximum number of read counts allowable without a substantial risk of data loss due to data degradation. If the read counter value does not satisfy the threshold, another read command may be received (at operation 610) and the read counter subsequently incremented (at operation 620).

At operation 640, responsive to processing logic determining that the value reflected by the read counter satisfies the threshold criterion, the processing logic triggers the performance of a data integrity scan. The data integrity scan may be a scan to verify that data stored in the memory cells has not degraded past a threshold degradation and/or to determine data that needs to be erased and re-written to the memory cells because of errors introduced (e.g., due to read disturb). In some embodiments, the data integrity scan is a read disturb scan to detect read disturb in the memory cells. A read disturb scan may sample data stored in memory cells at every wordline of a block. The read disturb scan may measure a bit error rate and compare the error rate with a reliability threshold. If the bit error rate does not meet the reliability threshold, a data refresh (e.g., a data erase and re-write) may be triggered.

Figure 7:
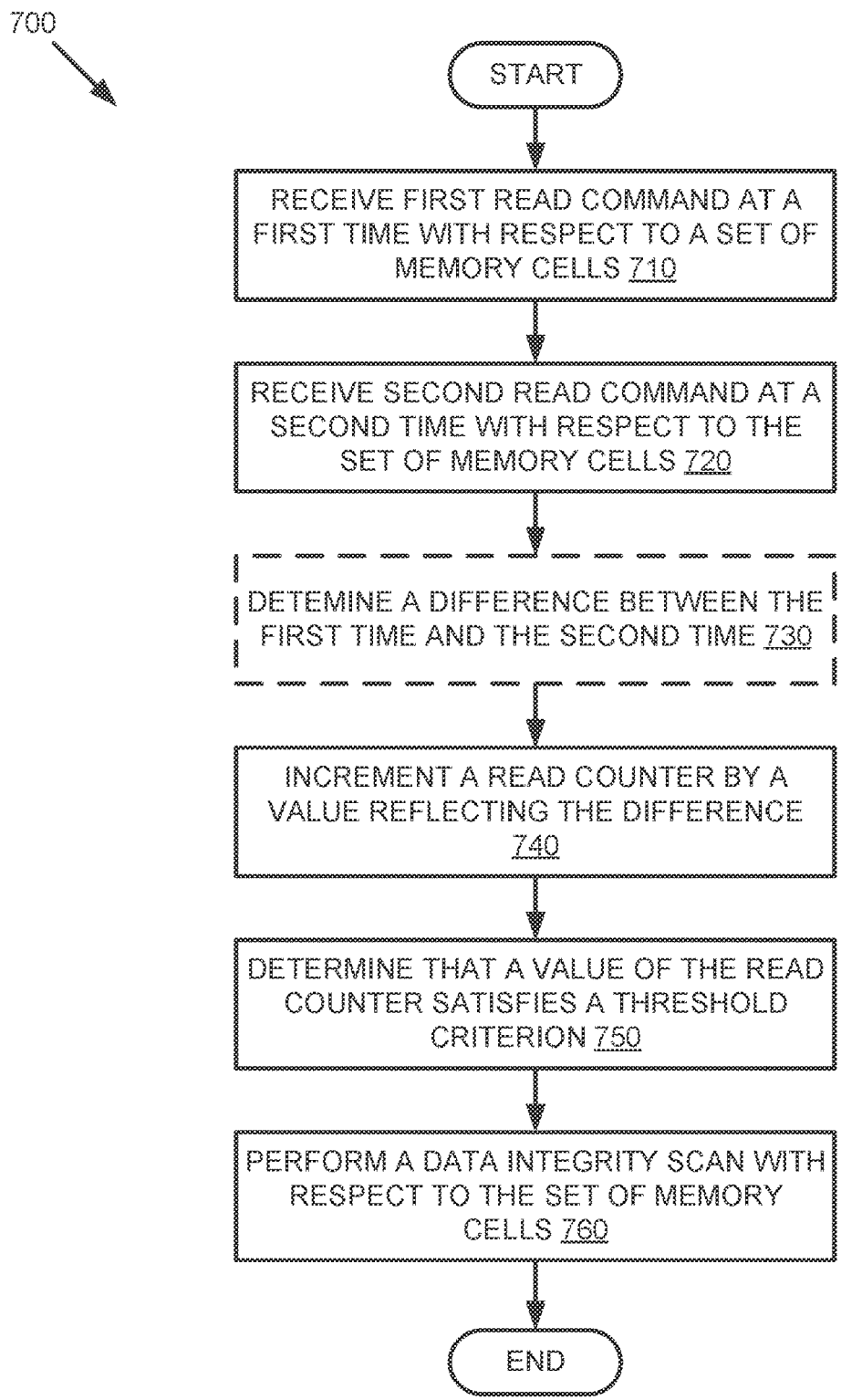
FIG. 7 is a block diagram of an example method of incrementing a read counter for a memory device in accordance with some embodiments of the present disclosure.

FIG. 7 is a block diagram of an example method 700 of incrementing a read counter for a memory device in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the media management component 113 of FIGS. 1A-1B. In some embodiments, the method 700 is performed by the host system 120 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 710, processing logic receives a first read command. The first read command may be received at a first time. The first read command may be with respect to a first set of memory cells of a memory device. In some embodiments, the first read command may be with respect to a block of memory cells (e.g., a memory block, a block, etc.). In some embodiments, the first read command may be with respect to memory cells coupled to a specific wordline. For example, the first read command may be for a read operation to be performed on a set of memory cells of a block of a memory device, or for a read operation to be performed on a set of memory cells coupled to a single wordline. The first read command may specify a physical address of the memory cells to be read according to the first read command. For example, the first read command may specify a block address of a group of memory sells to be read or may indicate a wordline address of a group of memory cells to be read. A timestamp corresponding to the first time and/or a physical address (e.g., of the block and/or wordline) specified by the first read command may be entered into a FIFO matrix (e.g., by media management component 113 of FIGS. 1A-1B).

At block 720, processing logic receives a second read command. The second read command may be received at a second time after the first time. The second read command may be with respect to a second set of memory cells of the memory device. The second read command may specify a physical address of the memory cells to be read according to the second read command. In some embodiments, the second read command may be with respect to the same set of memory cells as the first read command. A timestamp corresponding to the second time and/or a physical address specified by the second read command may be entered into the FIFO matrix.

At block 730, processing logic determines a difference between the first time and the second time. The difference between the first time and the second time may correspond to an amount of latent read disturb occurring in one or more memory cells. For example, a small difference between the first time and the second time may correspond to a low amount of latent read disturb, while a comparatively larger difference between the first time and the second time may correspond to a higher amount of latent read disturb.

At block 740, processing logic increments a read counter for associated with the set of memory cells of the memory device by a value reflecting the difference between the first time and the second time. For example, where the difference is small, the processing logic increments the read counter by a smaller value. Incrementing the read counter by a smaller value serves to procrastinate the timing of the read counter reaching a threshold value to trigger a data integrity scan. Because less latent read disturb is present when the difference is small, a data integrity scan can be performed less often. In another example, where the difference is large, the processing logic increments the read counter by a larger value. Incrementing the read counter by a larger value serves to accelerate the timing of the read counter reaching the threshold value to trigger the data integrity scan. Because more latent read disturb is present when the difference is large, the data integrity scan may be performed more often to ensure data integrity.

At block 750, processing logic determines that a value of the read counter satisfies a threshold criterion. The threshold criterion may correspond with a predetermined read count value indicative of voltage shift in the set of memory cells as a result of read disturb.

At block 760, processing logic performs a data integrity scan with respect to the set of memory cells responsive to determining that the value of the read counter satisfies the threshold criterion in block 750. The data integrity scan may be a scan of the set of memory cells to determine an error rate and/or to determine data integrity. The data integrity scan may be determine whether data stored in the memory cells has degraded and is in need of a refresh.

Figure 8:
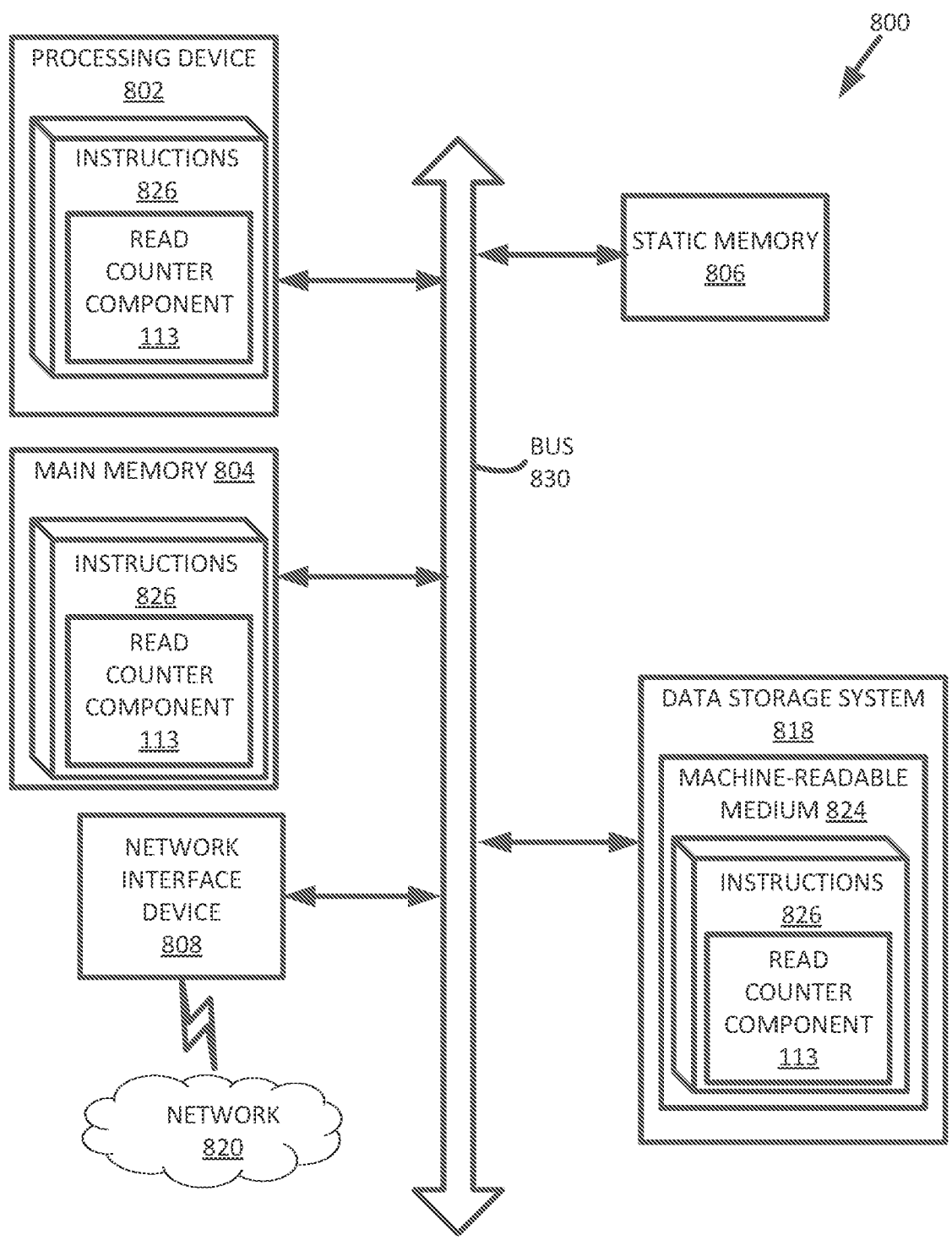
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the media management component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium or a non-transitory computer-readable storage medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to the media management component 113 of FIG. 1A. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device comprising a plurality of memory cells; and
   a processing device operatively coupled with the memory device, the processing device to:
   receive a first read command at a first time, wherein the first read command is with respect to a set of memory cells of the plurality of memory cells of the memory device;
   receive a second read command at a second time, wherein the second read command is with respect to the set of memory cells of the plurality of memory cells of the memory device;
   increment a read counter for the memory device by a value reflecting a difference between the first time and the second time;
   determine that a value of the read counter satisfies a threshold criterion; and
   responsive to determining that the value of the read counter satisfies the threshold criterion, perform a data integrity scan with respect to the set of memory cells.

2. The system of claim 1, wherein the processing device is further to:
   determine that a first block address corresponding to the first read command matches a second block address corresponding to the second read command; and
   responsive to determining that the first block address matches the second block address, determine the difference between the first time and the second time.

3. The system of claim 2, wherein the processing device is further to:
   program a characteristic of the first read command to a read command matrix; and
   program the characteristic of the second read command to the read command matrix, wherein determining that the first block address matches the second block address is based on the characteristic stored in the read command matrix.

4. The system of claim 1, wherein the processing device is further to:
   determine, based on values stored in a look up table, a scaling factor reflecting the difference between the first time and the second time, wherein the read counter is incremented based on the scaling factor.

5. The system of claim 4, wherein the processing device is further to:
   determine that a first wordline address corresponding to the first read command matches a second wordline address corresponding to the second read command, wherein the scaling factor is determined responsive to determining that the first wordline address matches the second wordline address.

6. The system of claim 1, wherein the processing device is further to:
   determine an average read delay based on a number of read commands received during a period of time, wherein the difference between the first time and the second time is determined based on the average read delay.

7. The system of claim 1, wherein the processing device is further to:
   create a new entry of a read command matrix, wherein the new entry is associated with the first read command, and wherein the new entry comprises one or more of a timestamp associated with the first read command corresponding to the first time or a first block address associated with the first read command.

8. A method comprising:
   receiving a first read command at a first time, wherein the first read command is with respect to a set of memory cells of a plurality of memory cells of a memory device;
   receiving a second read command at a second time, wherein the second read command is with respect to the set of memory cells of the plurality of memory cells of the memory device;
   incrementing a read counter for the memory device by a value reflecting a difference between the first time and the second time;
   determining that a value of the read counter satisfies a threshold criterion; and
   responsive to determining that the value of the read counter satisfies the threshold criterion, perform a data integrity scan with respect to the set of memory cells.

9. The method of claim 8, further comprising:
   determining that a first block address corresponding to the first read command matches a second block address corresponding to the second read command; and
   responsive to determining that the first block address matches the second block address, determining the difference between the first time and the second time.

10. The method of claim 9, further comprising:
    programming a characteristic of the first read command to a read command matrix; and programming the characteristic of the second read command to the read command matrix, wherein determining that the first block address matches the second block address is based on the characteristic stored in the read command matrix.

11. The method of claim 8, further comprising:
determining, based on values stored in a look up table, a scaling factor reflecting the difference between the first time and the second time, wherein the read counter is incremented based on the scaling factor.

12. The method of claim 11, further comprising:
determining that a first wordline address corresponding to the first read command matches a second wordline address corresponding to the second read command, wherein the scaling factor is determined responsive to determining that the first wordline address matches the second wordline address.

13. The method of claim 8, further comprising:
determining an average read delay based on a number of read commands received during a period of time, wherein the difference between the first time and the second time is determined based on the average read delay.

14. The method of claim 8, further comprising:
creating a new entry of a read command matrix, wherein the new entry is associated with the first read command, and wherein the new entry comprises one or more of a timestamp associated with the first read command corresponding to the first time or a first block address associated with the first read command.

15. A non-transitory computer-readable storage medium comprising instructions that, when executed by a processing device, cause the processing device to:
receive a first read command at a first time, wherein the first read command is with respect to a set of memory cells of a plurality of memory cells of a memory device represented by a first block;
receive a second read command at a second time, wherein the second read command is with respect to the set of memory cells;
determine that a first block address corresponding to the first read command matches a second block address corresponding to the second read command;
increment a read counter for the memory device by a value reflecting a difference between the first time and the second time;
determine that a value of the read counter satisfies a threshold criterion; and
responsive to determining that the value of the read counter satisfies the threshold criterion, perform a data integrity scan with respect to the set of memory cells.

16. The non-transitory computer-readable storage medium of claim 15, wherein the processing device is further to:
program a characteristic of the first read command to a read command matrix; and
program the characteristic of the second read command to the read command matrix, wherein determining that the first block address matches the second block address is based on the characteristic stored in the read command matrix.

17. The non-transitory computer-readable storage medium of claim 15, wherein the processing device is further to:
determine, based on values stored in a look up table, a scaling factor reflecting the difference between the first time and the second time, wherein the read counter is incremented further based on the scaling factor.

18. The non-transitory computer-readable storage medium of claim 17, wherein the processing device is further to:
determine that a first wordline address corresponding to the first read command matches a second wordline address corresponding to the second read command, wherein the scaling factor is determined responsive to determining that the first wordline address matches the second wordline address.

19. The non-transitory computer-readable storage medium of claim 15, wherein the processing device is further to:
determine an average read delay based on a number of read commands received during a period of time, wherein the difference between the first time and the second time is determined based on the average read delay.

20. The non-transitory computer-readable storage medium of claim 15, wherein the processing device is further to:
create a new entry of a read command matrix, wherein the new entry is associated with the first read command, and wherein the new entry comprises one or more of a timestamp associated with the first read command corresponding to the first time or a first block address associated with the first read command.

* * * * *